US011509531B2

(12) United States Patent
Tarrant (10) Patent No.: US 11,509,531 B2
(45) Date of Patent: Nov. 22, 2022

(54) CONFIGURATION SHARING AND VALIDATION FOR NODES IN A GRID NETWORK

(71) Applicant: Red Hat, Inc., Raleigh, NC (US)

(72) Inventor: Tristan Tarrant, Cernobbio (IT)

(73) Assignee: RED HAT, INC., Raleigh, NC (US)

( * ) Notice: Subject to any disclaimer, the term of this patent is extended or adjusted under 35 U.S.C. 154(b) by 108 days.

(21) Appl. No.: 16/174,321

(22) Filed: Oct. 30, 2018

(65) Prior Publication Data
US 2020/0136900 A1 Apr. 30, 2020

(51) Int. Cl.
| | |
|---|---|
| *H04L 41/084* | (2022.01) |
| *H04L 41/0813* | (2022.01) |
| *G06F 9/445* | (2018.01) |
| *G06F 16/215* | (2019.01) |

(52) U.S. Cl.
CPC ........ *H04L 41/084* (2013.01); *G06F 9/44505* (2013.01); *G06F 16/215* (2019.01); *H04L 41/0813* (2013.01)

(58) Field of Classification Search
CPC .............. H04L 41/084; H04L 41/0813; G06F 9/44505; G06F 16/215
USPC .................................................. 709/220, 221
See application file for complete search history.

(56) References Cited

U.S. PATENT DOCUMENTS

| | | | | |
|---|---|---|---|---|
| 5,574,849 | A * | 11/1996 | Sonnier ............ | G01R 31/31727 711/E12.026 |
| 7,173,927 | B2 * | 2/2007 | Kumar ............... | H04Q 11/0005 370/352 |
| 8,805,984 | B2 | 8/2014 | Markus et al. | |
| 8,898,680 | B2 | 11/2014 | Gleyzer | |
| 8,898,728 | B2 | 11/2014 | Sreehari et al. | |
| 2009/0254998 | A1 * | 10/2009 | Wilson ................. | G06F 9/5027 726/27 |
| 2010/0114919 | A1 * | 5/2010 | Sandhu ............. | H04L 29/08729 707/755 |
| 2013/0124921 | A1 * | 5/2013 | Canini ................. | G06F 11/008 714/33 |
| 2017/0195458 | A1 | 7/2017 | Parekh et al. | |

(Continued)

OTHER PUBLICATIONS

"Self-Healing 100% Uptime Dynamic Clustering—TayzGrid," Alachisoft, 2002, http://www.alachisoft.com/tayzgrid/dynamic-clustering.html.

(Continued)

*Primary Examiner* — David R Lazaro
*Assistant Examiner* — Mariegeorges A Henry
(74) *Attorney, Agent, or Firm* — Kilpatrick Townsend & Stockton LLP (57) ABSTRACT

A command and response messaging mechanism for use between nodes of a homogeneous data grid can allow a configuration state to be quickly provisioned to the nodes of a cluster at run time for an application running on the data grid. For example, a processing device of a node can receive a global configuration state from a peer node in the grid network. The processing device can apply common values for symmetrical attributes from the global configuration state to a local configuration. The processing device can also apply individual node values for asymmetrical attributes from the global configuration state to the local configuration. The processing device can then run the application on the local node using the local configuration.

20 Claims, 6 Drawing Sheets

(56) References Cited

U.S. PATENT DOCUMENTS

2017/0309061 A1* 10/2017 Wang .................... G06T 19/00
2018/0109421 A1*  4/2018 Laribi ................. H04L 43/0817
2018/0139108 A1*  5/2018 Fulton ...................... G06F 8/65
2019/0034487 A1*  1/2019 Balachandran ....... G06F 16/335

OTHER PUBLICATIONS

"Hazelcast IMDG Reference Manual," Oct. 10, 2018, https://docs_hazelcast.org/docs/latest/manual/html-single/.
Vashisht, P., et al., "Efficient Dynamic Replication Algorithm Using Agent for Data Grid," The Scientific World Journal, 2014, https://www.ncbi.nlm.nih.gov/pmc/articles/PMC3982471/.

* cited by examiner

CONFIGURATION SHARING AND VALIDATION FOR NODES IN A GRID NETWORK

TECHNICAL FIELD

The present disclosure relates generally to grid computing systems. More specifically, but not by way of limitation, this disclosure relates to provisioning nodes with configuration information at run time for an application and validating the configuration information to maintain performance as nodes leave and rejoin a cluster within a grid network.

BACKGROUND

A data grid includes multiple connected nodes. A node can be implemented by a server. A group of nodes used to run an application can be referred to as a cluster of nodes. In some distributed processing networks, an external entity such as an orchestrator, a master node, or a domain controller provisions all nodes as needed. However, a data grid is typically composed of multiple near-homogenous nodes without a central registry. In a data grid, it is important to ensure that the configuration of shared entities, such as clustered caches, is uniform across the cluster, while still allowing for individual overrides to be applied for node-specific (server-specific) attributes. A configuration provisioning system such as Ansible or Chef can be used to propagate configurations across nodes and ensure compatibility and uniformity across a cluster prior to using the grid. Such a tool is run independently each time node configurations need to be changed for an application.

DETAILED DESCRIPTION

In a data grid composed of multiple near-homogenous nodes without a central registry, it can be important for the performance and integrity of an application run on the grid to ensure that specifications of resources (e.g., shared caches) are symmetrical across the cluster, while still allowing for individual overrides to be applied for node-specific attributes. As an example, some node-specific attributes are sometimes needed to accommodate differences in the processing power or memory capacity of the servers running the nodes. However, attributes that define the period of time that data remains in the portion of the clustered cache in the node or cluster wide criteria that define how long old data remains cached need to be consistent across all nodes. Such attributes can include persistence, eviction, and expiration. If the configuration of a shared entity is not uniform with respect to such attributes, performance can suffer, and data loss can occur. In order to maximize throughput of the data grid over time, it is also advantageous to minimize the time for node configurations to be provisioned for each application.

Some examples of the present disclosure overcome one or more of the issues mentioned above by providing a command and response messaging mechanism for use between nodes of a homogeneous data grid that allows a configuration state to be quickly provisioned to the nodes of a cluster at run time for each application running on the data grid. The use of this command and response mechanism eliminates the need for a separate tool to manage configuration states of the nodes and instead permits a node to learn of the appropriate configuration state from a peer node, speeding up the process of configuring a cluster of nodes for running an application. A cluster of nodes of the data grid can therefore be configured for an application at run time for the application, allowing for greater throughput of the data grid over time.

In some examples, a node has a processing device that can receive a global configuration state from a peer node in a grid network. The global configuration state is intended to provision a cluster of nodes for running an application. The global configuration state defines a collective state in which a cluster of nodes are to be provisioned in the grid network for running an application. The processing device applies common values for symmetrical attributes from the global configuration state to a local configuration. The local configuration is the configuration for the node, which can be referred to for purposes of this discussion as the local node. The processing device applies individual node values for asymmetrical attributes from the global configuration state to the local configuration. An individual node value is a value that is specific to the node in the grid network. The processing device can then run the application on the local node using the local configuration.

In some examples, the local node can leave the cluster while an application is running. In order to rejoin the cluster, the local node can compare a persistent copy of the local configuration to a current global configuration state, which may have been updated since the local node left the cluster. The local node can rejoin the cluster when the symmetrical attributes in the local configuration and the current global configuration state are equal. In some examples the local node can receive the global configuration state from the peer node in the grid network upon joining the cluster of nodes. Since all nodes are peers, the local node, when part of a cluster, can forward the global configuration state to other nodes in the cluster of nodes.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
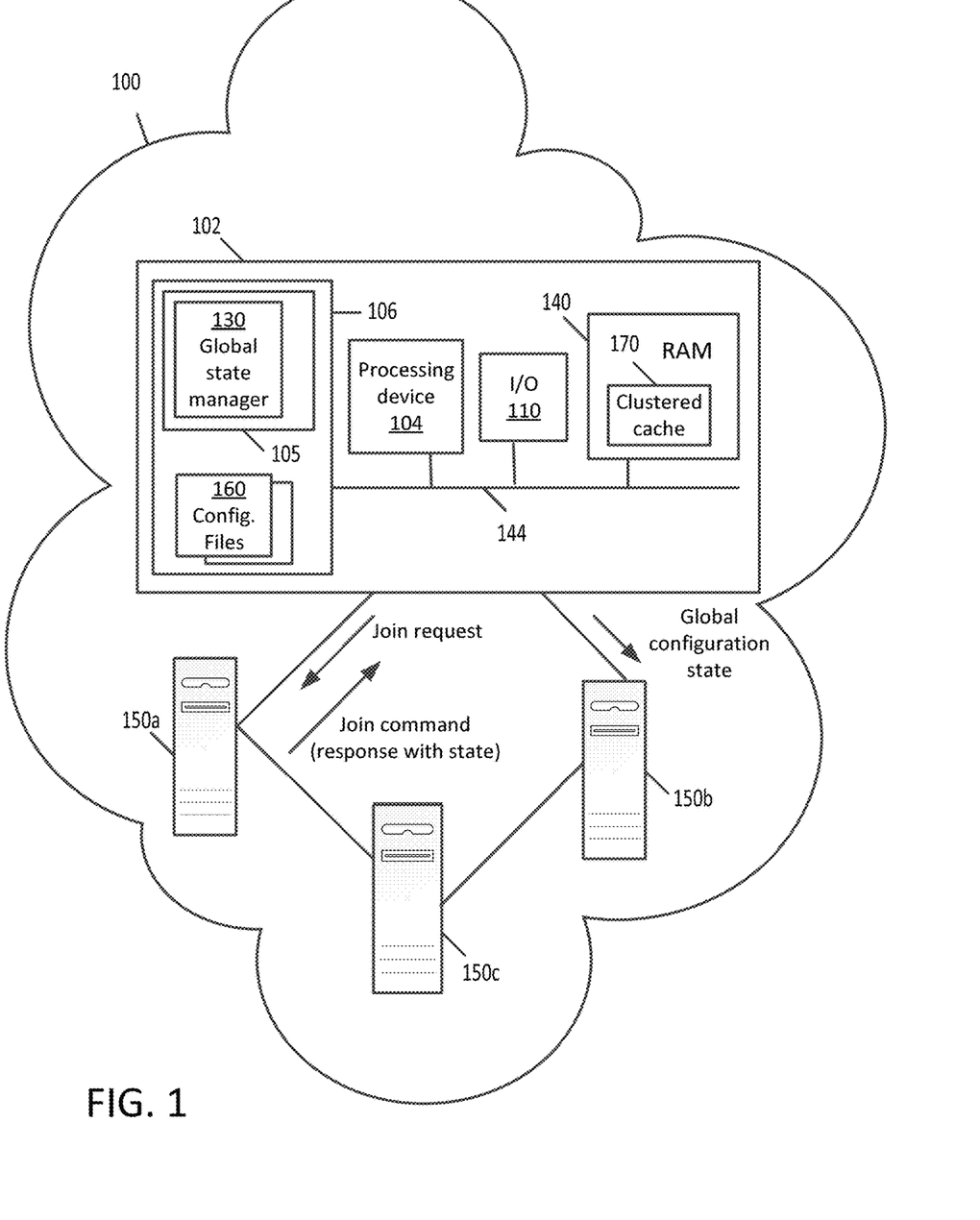
FIG. 1 is a block diagram of an example of a system that provides node configuration sharing and validation in a grid network according to some aspects of the disclosure.

FIG. 1 is a block diagram of an example of a system that provides node configuration sharing and validation in a grid network according to some aspects of the disclosure. More specifically, the system 100 includes a computing device 102, which is implementing the functions of a local node in a cluster that can run a distributed computing application. Computing device 102 may from now on be referred to as node 102. Examples of the computing device 102, can include a dedicated server, laptop computer, desktop computer, or any combination of these. The node 102 can execute software as discussed below, which causes node 102 to perform the tasks of providing node configuration sharing and validation according to some aspects of the disclosure as well as running an application as part of the cluster. Software can include computer-readable instructions that are executable by a processing device 104, such as program code instructions 105. Program code instructions 105 include instructions to implement a global state manager 130. The system can be programmed in any suitable programming language, such as Java, C++, C, Python, or any combination of these. Note that the software that implements cloud resource management as described in an exemplary fashion herein is distinct from the software that makes up applications running in the cloud network.

In FIG. 1, node 102 includes the processing device 104, memory device 106, an input/output (I/O) module or modules 110, and a random-access memory (RAM) 140. A bus or interconnect 144 is also provided to allow for inter- and intra-device communications using, for example, I/O module 110. I/O module 110 can include a network interface (not shown), which in turn communicates with peer nodes 150a, 150b, and 150c, which in this example, along with node 102, make up at least a portion of a hardware cluster. Each of the peer nodes 150a-c can include a processing device, a memory device, I/O, and other components similar to node 102 and other typical computing devices.

Still referring to FIG. 1, memory device 106 can further include stored, configuration files 160. Examples of the configuration files 160 can include a file that includes a global configuration state for the cluster, and a file that includes a local configuration for the local node 102. Global state manager 130 manages and the global configuration state. In this example, attributes from the global configuration state as well as locally applied attributes that are specific to the node are used to specify a cluster cache 170. The cluster cache 170 can reside in RAM 140 and can be used by the application that the cluster is running. In this example, when node 102 joins the cluster, it issues a join request to peer node 150a, which issues a response in the form of a join command. The join command includes the current global configuration state embedded therein. This global configuration state is stored in memory device 106 as a configuration file 160. Once node 102 is part of the cluster that includes nodes 102, 150a, 150b, and 150c, node 102 can send the global configuration state to other nodes such as peer node 150b. Commands and responses related to communicating the global configuration state are forwarded by a communication layer (not shown) that services the global state manager 130. The global configuration state includes various attributes. Each attribute can be symmetrical, where all nodes must have the same value for the attribute to ensure correct functioning in a clustered environment, or asymmetrical, where individual nodes can override specific parameters with local environment parameter values.

Figure 2:
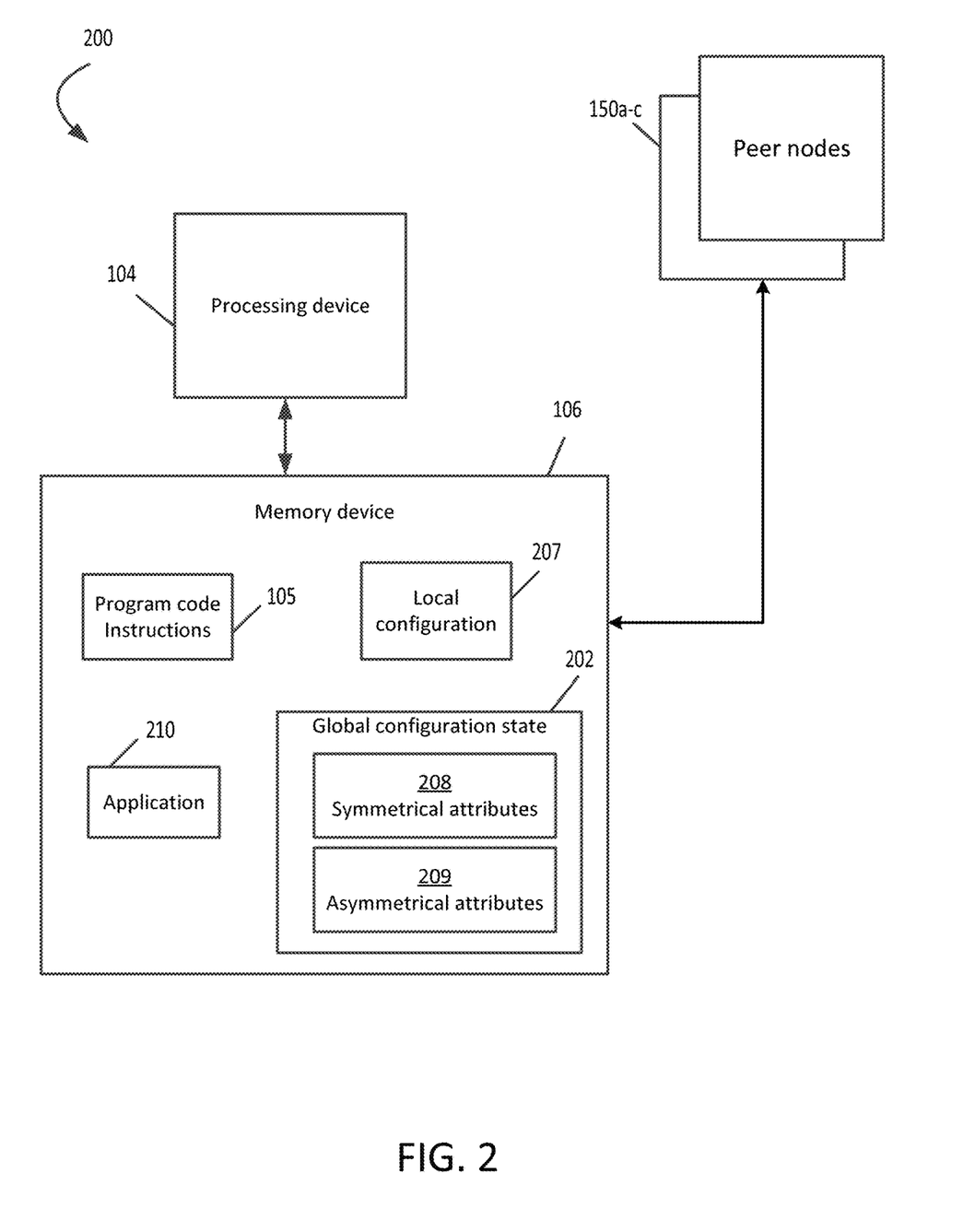
FIG. 2 is a block diagram of another example of a system that provides node configuration sharing and validation in a grid network according to some aspects of the disclosure.

FIG. 2 is a block diagram of another example of a system that provides node configuration sharing and validation in a grid network according to some aspects of the disclosure. The system 200 includes the processing device 104 that can execute computer program code, also referred to as instructions or program code instructions, for performing operations related to node configuration sharing and validation in a grid network according to some aspects of the disclosure. Processing device 104 is communicatively coupled to the memory device 106. The processing device 104 can include one processing device or multiple processing devices. Non-limiting examples of the processing device 104 include a field-programmable gate array (FPGA), an application-specific integrated circuit (ASIC), a microprocessor, etc.

The processing device 104 can execute one or more operations for applying attributes as specified in the global configuration state 202 to the node's local configuration 207. The processing device 104 can execute program code instructions 105 stored in the memory device 106. Computer program code instructions 105 can include instructions to apply common values for symmetrical attributes 208 from the global configuration state 202 to the local configuration 207. The local configuration is the configuration for the local node, in this example, the node with the processing device 104. The processing device can also apply individual node values for asymmetrical attributes 209 from the global configuration state to the local configuration 207. The local configuration is a list of all attributes used by the node to configure itself for use in the cluster and their values. This list can be stored in memory device 106 as a file or collection of files. The processing device can then run the application 210 on the local node using the local configuration 207. The global configuration state can be sent or received from peer nodes 150a-c. Application 210 can be any application for which grid computing systems are typically used. Such applications are typically those that solve grand challenge problems, such as problems related to weather, genetics, or economics.

Memory device 106 can include one memory device or multiple memory devices. The memory device 106 can be non-volatile and may include any type of memory device that retains stored information when powered off. In some examples, at least some of the memory device can include a non-transitory computer-readable medium from which the processing device 104 can read instructions 105. A computer-readable medium can include electronic, optical, magnetic, or other storage devices capable of providing the processing device with computer-readable instructions 105 or other program code. Non-limiting examples of the memory device 106 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions. Although FIGS. 1 and 2 depict a certain arrangement of components for illustrative purposes, other examples can include any number and combination of these components arranged in any suitable configuration.

Figure 3:
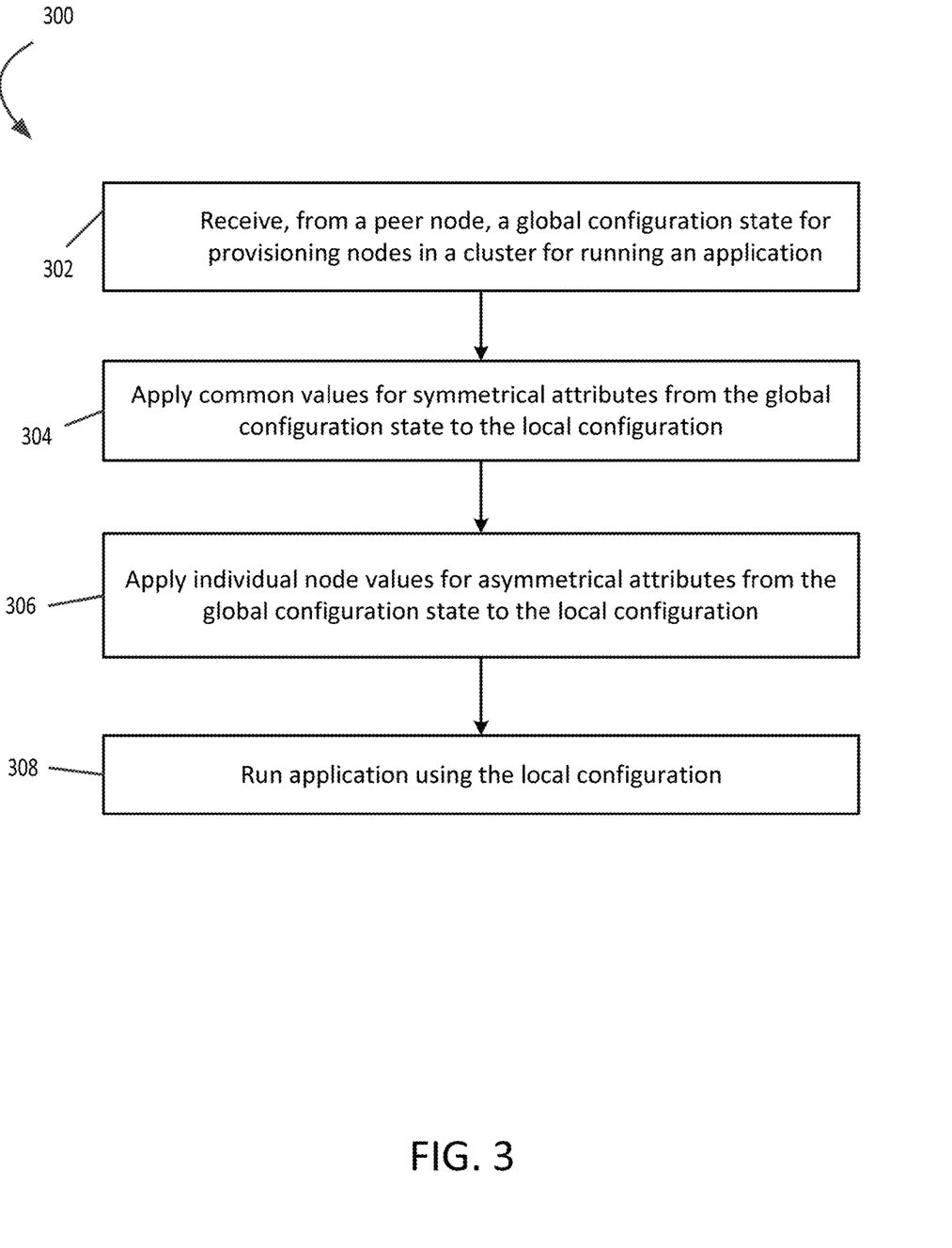
FIG. 3 is a flowchart of an example of a process for providing node configuration sharing and validation in a grid network according to some aspects of the disclosure.

In some examples, a processing device (e.g., processing device 104) can perform one or more of the operations shown in FIG. 3 to provide node configuration sharing and validation in a grid network according to some aspects of the disclosure. In other examples, the computing device can implement more operations, fewer operations, different operations, or a different order of the operations depicted in FIG. 3. Process 300 of FIG. 3 is described below with reference to components discussed above.

At block 302, processing device 104 receives, from a peer node, using I/O module 110, a global configuration state for provisioning nodes in a cluster for running an application. At block 304 processing device 104 applies common values for symmetrical attributes 208 from the global configuration state 202 to the local configuration 207. The local configuration and global configuration state can be stored in memory device 106 as configuration files 160. At block 306, processing device 104 applies individual node values for asymmetrical attributes 209 from the global configuration state 202 to the local configuration 207. In order to apply values to the local configuration, the values can be copied into a stored local configuration file. At block 308, the application for the cluster is run on the local node using local configuration 207.

The global state manager in the nodes of the grid network implements a dynamic clustered configuration by performing a number of tasks. The global state manager defines a configuration structure as a hierarchy of elements and attributes. Each attribute can be marked as either being symmetrical, where all nodes must have the same value for the attribute to ensure correct functioning in a clustered environment, or as being asymmetrical, where individual nodes can override specific parameters with local environment parameter values. The global state manager automatically propagates configurations provisioned at runtime to all nodes present in the cluster at the time of definition of the configurations. Any node in the cluster may be the initiator of clustered configuration provisioning as all nodes are peers. The global configuration manager can also validate configurations on all nodes to ensure that symmetrical attributes are identical across all nodes in the cluster.

The global state manager allows a node to apply individual node overrides to asymmetrical attributes, which may have local environment defined configurations. An example of node specific attributes is file system paths. Each node persists valid configurations locally, so that, in case a node leaves and returns, the node can verify that when it rejoins, its configuration is still consistent with the global configuration state. New nodes, that is nodes that were not present in the initial cluster or since the last configuration change was applied to a pre-existing cluster, can be added. New nodes, when joining a cluster, receive the clustered configuration from the cluster, validate it against their local configuration to make sure the node's hardware is capable of running the application configured with the symmetrical attributes, and apply them to create a local configuration. If a node leaves a cluster and rejoins, its local persisted configuration will be revalidated against the current global configuration state for the cluster. If any incompatible changes to the global configuration state have occurred during the node absence, the node will refrain from rejoining the cluster in order to preserve any other locally persisted data. Such locally persisted data may be corrupted if the process of joining the cluster was allowed to continue. In this case, an error describing the situation is output allowing manual repair or intervention. If the changes to the global configuration state during the node's absence are additive, for example, a new cache configuration, the grid network can be set up to allow the rejoining node to apply the changes locally and rejoin the cluster.

Figure 4:
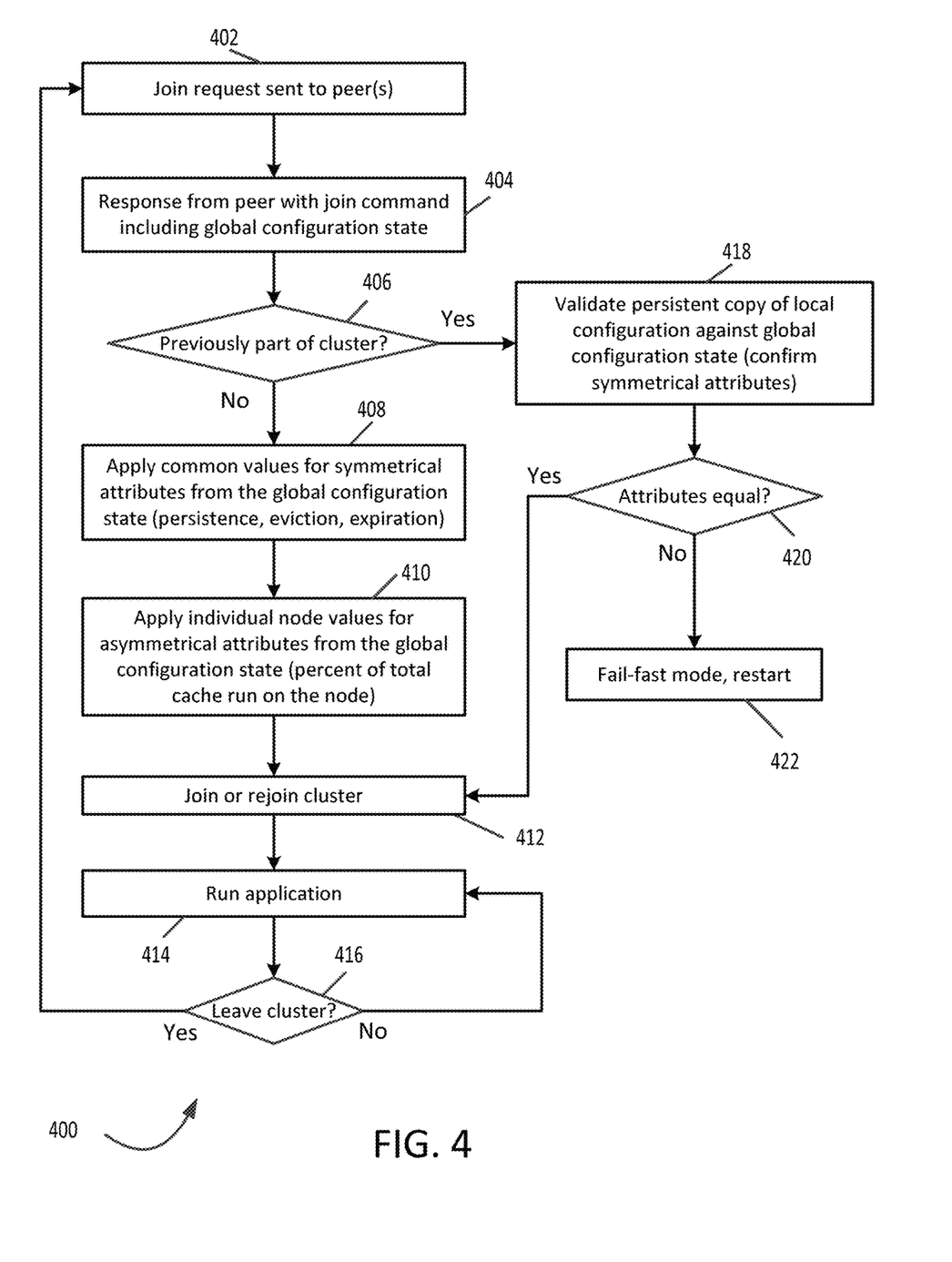
FIG. 4 is a flowchart of another example of a process for providing node configuration sharing and validation in a grid network according to some aspects of the disclosure.

As an example of the operation of the global state manager described above, a computing device such as processing device 104 can perform the operations of process 400 shown in FIG. 4 to provide node configuration sharing and validation in a grid network. More specifically, at block 402, processing device 104 sends a join request to at least one peer node 150*a-c*. At block 404, the processing device 104 receives, as a response, a join command from a peer node. The request and response can be sent over the grid network through I/O module 110. The join command includes the current global configuration state. At block 406, a determination is made as to whether the local node was previously part of the cluster. If not, at block 408, processing device 104 applies common values for symmetrical attributes from the global configuration state to the local configuration. As examples, where a clustered cache is being configured for use by grid application, symmetrical attributes can include persistence, eviction, and expiration. The persistence attribute defines the period of time that data remains in the portion of the clustered cache in the node after the data is last used. Eviction and expiration are both cluster wide criteria that define how long old data remains cached. Eviction specifies a maximum number of entries in the cache and expiration specifies a maximum amount of time an entry remains.

Still referring to FIG. 4, at block 410, processing device 104 apples individual node values for asymmetrical attributes from the global configuration. Example of asymmetrical attributes include file paths or the maximum percentage of total cache for the cluster that is run on the individual node. The value for asymmetrical attributes can be adjusted based on the capabilities of each node in terms of memory and the processing power available to manage the memory. At block 412, the local node joins the cluster (or possibly rejoins the cluster if it was previously a part of the cluster). At block 414, the processing device runs the clustered application. If the local node leaves the cluster at block 416, it can rejoin beginning with process 400 at block 402. Otherwise, the node keeps running the clustered application.

Returning to block 406 of FIG. 4, if the local node seeking to join the cluster was previously part of the cluster, it can rejoin the cluster in an expedited fashion by validating, at block 418, a stored, persistent copy of the local configuration against the current global configuration state. Processing device 104 compares values for symmetrical attributes and determines if all the attribute values are equal. If all values are equal at block 420, the node rejoins the cluster at block 412, otherwise, other action must be taken. In some examples the node enters fail-fast mode at block 422 if all the asymmetrical values are not equal. This mode ceases node activity and notifies an operator of the issue, at which point the node can be restarted as a new node or other action can be taken. This failure mode prevents locally persisted data, which may be useful, from being corrupted. A restart can also be handled automatically. Once restarted, the node can send a join request to a peer node and can be treated as a new node that was never part of the relevant cluster.

In some aspects, the global state manager can include the capability of evaluating whether a new global configuration state includes symmetrical attributes that are additive to the persistent local configuration of a rejoining node. Thus, if the equality of all the symmetrical attributes present in the persistent local configuration is validated as described above, new attributes from the new global configuration are added to the rejoining node and it rejoins the cluster.

Figure 5:
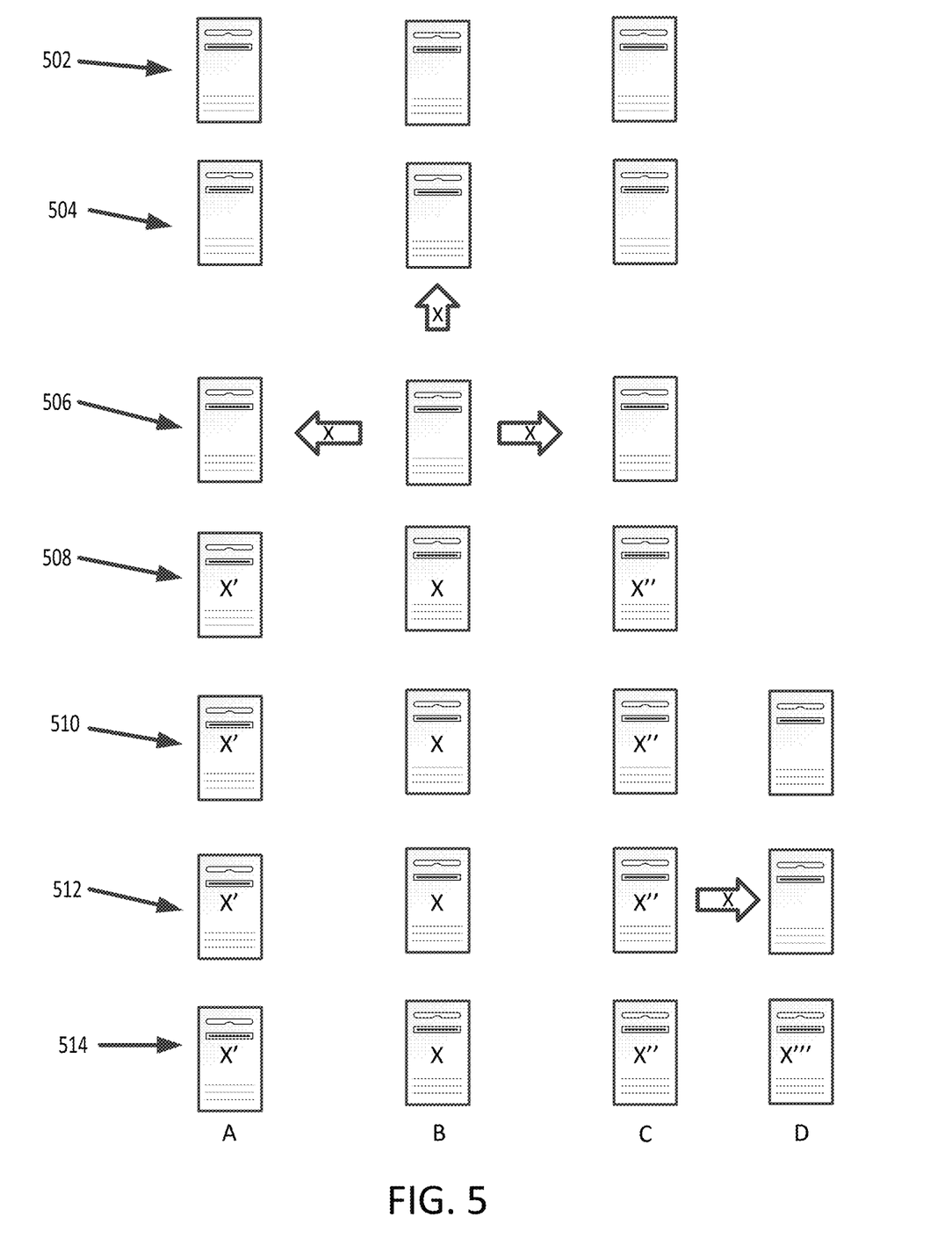
FIG. 5 is a state diagram for an example of node configuration sharing over time in a cluster of a grid network according to some aspects of the disclosure.
Figure 6:
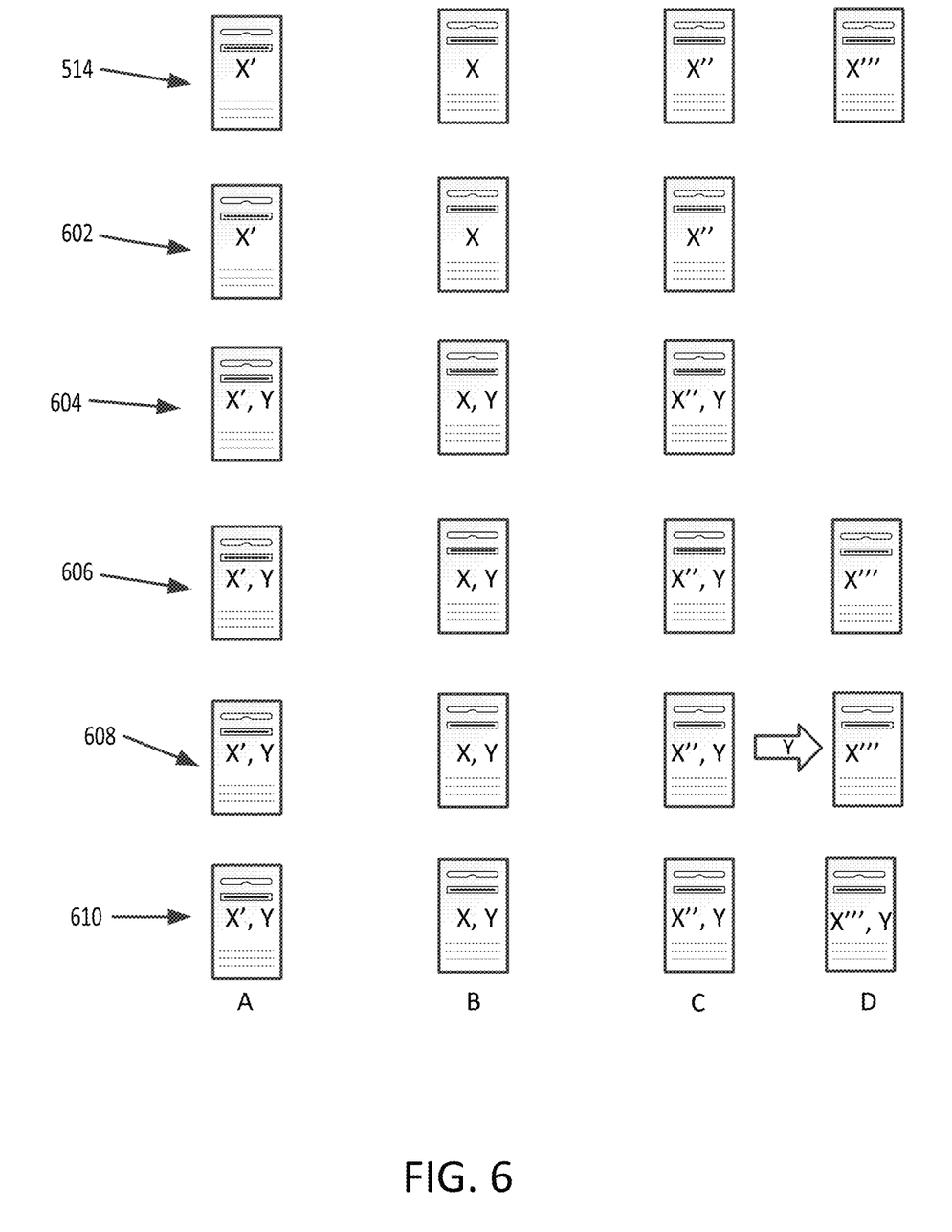
FIG. 6 is a state diagram for an example of node configuration sharing and validation over time in a cluster of a grid network according to some aspects of the disclosure.

FIG. 5 and FIG. 6 are node state diagrams that illustrate an example of node configuration sharing and validation over time in a cluster of a grid network according to some aspects of the disclosure. The grid network cluster of FIGS. 5 and 6 is described with reference to four nodes: node A, node B, node C and node D. These nodes are arranged in columns. Each row is a specific configuration state or a change of state of the nodes. These changes occur over time progressing down the page from top to bottom.

More specifically, FIG. 5 is a state diagram for node configuration sharing over time as a node joins the cluster. In FIG. 5, the cluster is provisioned at run time and an additional node joins the cluster. In configuration state 502, the cluster has no configuration. In state 504, the global configuration state X is applied to node B. In state 506, node B propagates configuration state X to nodes A and C. In state 508, nodes A and C apply local attribute overrides to the global configuration state X, creating local configurations X' and X", respectively. Node B retains the global configuration state with no changes as its local configuration. In state 510, node D sends a request to join the cluster. In state 512 of FIG. 5, node C sends global configuration state X to node D. In state 514, node D overrides one or more asymmetrical attributes locally to create local configuration X'''.

FIG. 6 is a state diagram for node configuration sharing and validation over time in a cluster of a grid network according to some aspects of the disclosure, as a node leaves and rejoins the cluster. For the convenience of the reader, the configuration states of FIG. 6 begin with state 514 from FIG. 5. In state 602, node D has left the cluster. In state 604, configuration Y with changes that can be added to the local configurations based on global configuration state Y has been applied to the cluster, creating a global configuration state X, Y, including local variants based on asymmetrical attributes that were originally included in global configuration state X. In state 606, node D rejoins the cluster and its persistent copy of local configuration X''' is validated against the new global configuration state X, Y. Since symmetrical attributes can be added and the existing ones are equal in value, node D is allowed to rejoin the cluster. In state 608, configuration Y is propagated to node D from node C. In state 610, all four nodes are part of the cluster. Node D now has local configuration X''', Y, a local variant of the current global configuration state X, Y.

Unless specifically stated otherwise, it is appreciated that throughout this specification that terms such as "operations," "processing," "computing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel. Terms such as "top," and "bottom" when referring to the physical arrangement of elements in a drawings are for reference only to guide the reader, and are not meant to imply any required order or arrangement of the elements pictured.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A node usable in a grid network, the node comprising:
a processing device, configured to run a distributed computing application at the node that is a part of a plurality of nodes in the grid network; and
a memory device including instructions that are executable by the processing device for causing the processing device to perform operations comprising:
receiving a global configuration state from a peer node configured to run the distributed computing application in the grid network, the global configuration state defining a collective state in which a cluster of nodes including a clustered cache is to be provisioned in the grid network for running the distributed computing application;
applying common values for symmetrical attributes of the global configuration state to a local configuration, a common value being a value that is common in the cluster of nodes in the grid network, the symmetrical attributes including a persistence for a clustered cache, and at least one of an eviction value or an expiration time, wherein the persistence defines a period of time that data remains in a portion of the clustered cache in the node after last use, and the at least one of the eviction value or the expiration time defines a cluster-wide value for the data cached across the cluster of nodes;
applying individual node values for asymmetrical attributes of the global configuration state to the local configuration, at least one individual node value configured to accommodate a difference in at least one of processing power or memory capacity of a server running the node as compared to other servers in the grid network; and
running the distributed computing application using the local configuration.

2. The node of claim 1 wherein the operations further comprise:
leaving the cluster of nodes;
comparing a persistent copy of the local configuration to the global configuration state; and
rejoining the cluster of nodes when the common values for the symmetrical attributes in the local configuration and the global configuration state are equal.

3. The node of claim 2 wherein the operations further comprise entering fail-fast mode when any of the individual node values for the symmetrical attributes in the local configuration and the global configuration state are different.

4. The node of claim 1 wherein the operation of applying the common values for symmetrical attributes comprises copying the common values into a local configuration file and wherein the operation of applying individual node values for asymmetrical attributes comprises copying the individual node values into the local configuration file, the individual node values including the at least one individual node value configured to accommodate the difference in at least one of processing power or memory capacity.

5. The node of claim 4 wherein the global configuration state is configured to be requested from the peer node via a join request and wherein the global configuration state is configured to be received in a join command sent in response to the join request.

6. The node of claim 1 wherein the operations further include maintaining, in the memory device, the symmetrical attributes within at least a portion of a clustered cache.

7. The node of claim 1 wherein the operations further comprise forwarding the global configuration state to at least one other node in the cluster of nodes.

8. The node of claim 7 further comprising:
an input/output (I/O) module connected to the processing device;
the peer node, wherein the peer node is communicatively coupled with the processing device via the I/O module; and
the at least one other node, wherein the at least one other node is communicatively coupled with the node via the I/O module.

9. A method comprising:
receiving, by a processing device in a node that is a part of a plurality of nodes configured to run a distributed computing application in a grid network, a global configuration state from a peer node in the grid network, the global configuration state defining a collective state in which a cluster of nodes including a clustered cache and usable to run the distributed computing application is to be provisioned in the grid network;

applying, by the processing device, common values for symmetrical attributes of the global configuration state to a local configuration, a common value being a value that is common in the cluster of nodes in the grid network, the symmetrical attributes including a persistence for a clustered cache, and at least one of an eviction value or an expiration time, wherein the persistence defines a period of time that data remains in a portion of the clustered cache in the node after last use, and the at least one of the eviction value or the expiration time defines a cluster-wide value for the data cached across the cluster of nodes;

applying, by the processing device, individual node values for asymmetrical attributes of the global configuration state to the local configuration, at least one individual node value accommodating a difference in at least one of processing power or memory capacity of a server running the node as compared to other servers in the grid network; and running the distributed computing application using the processing device and using the local configuration.

10. The method of claim 9 further comprising forwarding the global configuration state to at least one other node in the cluster of nodes.

11. The method of claim 9 further comprising:
leaving the cluster of nodes;
comparing a persistent copy of the local configuration to the global configuration state; and
rejoining the cluster of nodes when the common values for the symmetrical attributes in the local configuration and the global configuration state are equal.

12. The method of claim 9 wherein applying the common values for symmetrical attributes comprises copying the common values into a local configuration file and wherein applying the individual node values for asymmetrical attributes comprises copying the individual node values into the local configuration file, the individual node values including the at least one individual node value accommodating the difference in at least one of processing power or memory capacity.

13. The method of claim 12 wherein the global configuration state is requested from the peer node via a join request and wherein the global configuration state is received in a join command sent in response to the join request.

14. The method of claim 9 further comprising maintaining the symmetrical attributes within at least a portion of a clustered cache.

15. A non-transitory computer-readable medium comprising program code that is executable by a processing device for causing the processing device to:
receive, at a node that is a part of a plurality of nodes configured to run a distributed computing application in a grid network, a global configuration state from a peer node in the grid network, the global configuration state defining a collective state in which a cluster of nodes including a clustered cache is to be provisioned in the grid network for running the distributed computing application;

apply common values for symmetrical attributes of the global configuration state to a local configuration, a common value being a value that is common in the cluster of nodes in the grid network, the symmetrical attributes including a persistence for a clustered cache, and at least one of an eviction value or an expiration time, wherein the persistence defines a period of time that data remains in a portion of the clustered cache in the node after last use, and the at least one of the eviction value or the expiration time defines a cluster-wide value for the data cached across the cluster of nodes;

apply individual node values for asymmetrical attributes of the global configuration state to the local configuration, at least one individual node value configured to accommodate a difference in at least one of processing power or memory capacity of a server running the node as compared to other servers in the grid network; and run the distributed computing application using the local configuration.

16. The non-transitory computer-readable medium of claim 15 wherein the program code is configured to cause the processing device to:
leave the cluster of nodes;
compare a persistent copy of the local configuration to the global configuration state;
rejoin the cluster of nodes when the common values for the symmetrical attributes in the local configuration and the global configuration state are equal; and
enter fail-fast mode when any of the common values for the symmetrical attributes in the local configuration and the global configuration state are different.

17. The non-transitory computer-readable medium of claim 15 wherein the program code for causing the processing device to apply the common values for symmetrical attributes comprises program code for causing the processing device to copy the common values into a local configuration file and wherein the program code for causing the processing device to apply individual node values for asymmetrical attributes comprises program code for causing the processing device to copy the individual node values into the local configuration file, the individual node values including the at least one individual node value configured to accommodate the difference in at least one of processing power or memory capacity.

18. The non-transitory computer-readable medium of claim 17 wherein the global configuration state is configured to be requested from the peer node via a join request and wherein the global configuration state is configured to be received in a join command sent in response to the join request.

19. The non-transitory computer-readable medium of claim 15 wherein the program code is configured to cause the processing device to maintain the symmetrical attributes within at least a portion of a clustered cache.

20. The non-transitory computer-readable medium of claim 15 wherein the program code is configured to cause the processing device to forward the global configuration state to at least one other node in the cluster of nodes.

* * * * *